United States Patent
Terre et al.

(10) Patent No.: US 9,509,924 B2
(45) Date of Patent: Nov. 29, 2016

(54) WEARABLE APPARATUS WITH INTEGRATED INFRARED IMAGING MODULE

(71) Applicant: FLIR Systems, Inc., Wilsonville, OR (US)

(72) Inventors: William A. Terre, Santa Barbara, CA (US); Andrew C. Teich, West Linn, OR (US); Giovanni Lepore, Peabody, MA (US); Nicholas Högasten, Goleta, CA (US); Theodore R. Hoelter, Goleta, CA (US); Katrin Strandemar, Rimbo (SE)

(73) Assignee: FLIR SYSTEMS, INC., Wilsonville, OR (US)

(*) Notice: Subject to any disclaimer, the term of this patent is extended or adjusted under 35 U.S.C. 154(b) by 573 days.

(21) Appl. No.: 13/802,615

(22) Filed: Mar. 13, 2013

(65) Prior Publication Data
US 2013/0242110 A1    Sep. 19, 2013

Related U.S. Application Data

(63) Continuation-in-part of application No. PCT/US2012/041744, filed on Jun. 8, 2012, and a continuation-in-part of application No. PCT/US2012/041749, filed on Jun. 8, 2012, (Continued)

(51) Int. Cl.
*G02B 27/01* (2006.01)
*H04N 5/225* (2006.01)
(Continued)

(52) U.S. Cl.
CPC ............ *H04N 5/33* (2013.01); *H04N 5/2251* (2013.01); *H04N 5/2253* (2013.01);
(Continued)

(58) Field of Classification Search
None
See application file for complete search history.

(56) References Cited

U.S. PATENT DOCUMENTS

| 2,764,055 | A |   | 9/1956 | Clemens et al. |
|---|---|---|---|---|
| 5,089,914 | A | * | 2/1992 | Prescott ................. A42B 3/042 2/5 |

(Continued)

FOREIGN PATENT DOCUMENTS

| CA | 2764055 | 7/2012 |
|---|---|---|
| CN | 2874947 | 2/2007 |

(Continued)

OTHER PUBLICATIONS

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

*Primary Examiner* — Reza Aghevli
(74) *Attorney, Agent, or Firm* — Haynes and Boone, LLP

(57) ABSTRACT

Various techniques are disclosed for providing a wearable apparatus having an integrated infrared imaging module. In one example, a wearable apparatus implemented as a self-contained breathing apparatus (SCBA) may include a shield to protect a user from an external environment, one or more infrared imaging modules, a projector, a processor, and a communication module for projecting a user-viewable thermal image onto a surface of the shield. Such infrared imaging modules may be positioned internal to the SCBA for protection from a hazardous external environment. In another example, a wearable apparatus implemented as a welding mask may include one or more infrared imaging modules, a projector, a processor, and a communication module, so as to project a user-viewable thermal image onto a surface of a shield of the welding mask, while at the same time protecting these components and the welder's face from a harsh welding environment.

24 Claims, 15 Drawing Sheets

Related U.S. Application Data application No. 13/802,615, filed on Mar. 13, 2013, which is a continuation-in-part of application No. PCT/US2012/041739, filed on Jun. 8, 2012.

(60) Provisional application No. 61/612,794, filed on Mar. 19, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
*H04N 5/33* (2006.01)
*H04N 5/232* (2006.01)
*H04N 5/365* (2011.01)

(52) U.S. Cl.
CPC ..... *H04N 5/23229* (2013.01); *H04N 5/23254* (2013.01); *H04N 5/23293* (2013.01); *H04N 5/3658* (2013.01); *G02B 27/017* (2013.01); *G02B 2027/011* (2013.01); *G02B 2027/014* (2013.01); *G02B 2027/0118* (2013.01); *G02B 2027/0134* (2013.01); *G02B 2027/0138* (2013.01); *Y10T 29/49002* (2015.01)

(56) References Cited

U.S. PATENT DOCUMENTS

| | | | |
|---|---|---|---|
| 5,949,582 A * | 9/1999 | Coombs | G02B 27/017 348/E5.09 |
| 6,016,160 A * | 1/2000 | Coombs | A42B 3/042 348/61 |
| 6,023,288 A * | 2/2000 | Coombs | A42B 3/042 348/143 |
| 6,255,650 B1 * | 7/2001 | Warner | G02B 23/125 250/330 |
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,606,114 B1 * | 8/2003 | Gordon | A42B 3/042 348/164 |
| 6,633,231 B1 | 10/2003 | Okamoto et al. | |
| 6,681,120 B1 | 1/2004 | Kim | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,460,304 B1 * | 12/2008 | Epstein | A62B 18/082 2/6.3 |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 | 11/2009 | Zarnowski et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,537,343 B2 | 9/2013 | Zhang | |
| 8,781,420 B2 | 7/2014 | Schlub et al. | |
| 8,825,112 B1 | 9/2014 | Fraden et al. | |
| 2002/0006337 A1 | 1/2002 | Kimura et al. | |
| 2002/0030163 A1 * | 3/2002 | Zhang | G02B 23/125 250/330 |
| 2002/0058352 A1 | 5/2002 | Jacksen et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0122958 A1 * | 7/2003 | Olita | A42B 3/042 348/373 |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0068333 A1 | 3/2005 | Nakahashi et al. | |
| 2005/0089241 A1 | 4/2005 | Kawanishi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0279758 A1 | 12/2006 | Myoki | |
| 2006/0285907 A1 | 12/2006 | Kang et al. | |
| 2007/0004449 A1 | 1/2007 | Sham | |
| 2007/0019077 A1 | 1/2007 | Park | |
| 2007/0019099 A1 | 1/2007 | Lieberman et al. | |
| 2007/0019103 A1 | 1/2007 | Lieberman et al. | |

(56) References Cited

U.S. PATENT DOCUMENTS

| | | |
|---|---|---|
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0235634 A1* | 10/2007 | Ottney ............... G01J 5/02 250/214 VT |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 1983485 | 10/2008 |
| EP | 2136554 | 12/2009 |
| EP | 2477391 | 7/2012 |
| JP | 1997275518 | 4/1999 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |

(56) References Cited

FOREIGN PATENT DOCUMENTS

| | | |
|---|---|---|
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

\* cited by examiner

WEARABLE APPARATUS WITH INTEGRATED INFRARED IMAGING MODULE

CROSS-REFERENCE TO RELATED APPLICATIONS

This application claims the benefit of U.S. Provisional Patent Application No. 61/612,794 filed Mar. 19, 2012 and entitled "WEARABLE APPARATUS WITH INTEGRATED INFRARED IMAGING MODULE" which is hereby incorporated by reference it its entirety.

This application is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

This application is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to thermal imaging devices and more particularly, for example, to wearable devices for use with thermal imaging devices.

BACKGROUND

Various wearable devices have been developed to protect users while in hazardous environments. For example, self-contained breathing apparatus (SOBA) devices are widely utilized by firefighters and other emergency personnel to supply breathable air, as well as to protect their facial areas from heat, flames, debris, and other harmful elements when working in hazardous environments. In another example, welding masks are worn by welders to protect their facial areas from intense light, heat, sparks, and other harmful elements that may be generated during welding.

In these and other conditions, visible light imaging sensors (e.g., CCD-based or CMOS-based sensors) typically cannot capture useful images of surrounding environments when visibility is compromised. Conventional infrared cameras (e.g., used to capture thermal images) may also be unsuitable, because such cameras are typically too bulky and heavy, and are generally handheld or otherwise positioned external to the user. Also, field of view discrepancies and misalignment issues may occur, between where a user may be looking relative to where the conventional infrared camera is pointed, due to the externally mounted infrared camera (e.g., mounted on the helmet of the user) not being completely aligned and tracking precisely the head movements of the user. Moreover, external housings may be required to protect conventional infrared cameras from hazardous external environments. Such housings may add even further bulk and weight, and thus make conventional infrared cameras even more unsuitable for use in hazardous environments.

In addition, it is often difficult for users to view images while engaged in hazardous environments. For example, certain conventional displays (e.g., LCD screens to present images for a user to view directly and/or through a scope) are often problematic when used in hazardous environments. In this regard, external handheld display screens may be unwieldy and may limit the ability of a user to engage in activities. If provided within a mask of a wearable device, a conventional display may actually obstruct a user's view and may make it difficult for the user to adjust the screen position or to simultaneously view the surrounding external environment. Moreover, the mounting of conventional displays (e.g., screens, scopes, and/or eyepieces) at the outer periphery of a user's mask may adversely shift the center of gravity of the wearable device forward which may encumber and fatigue the user.

SUMMARY

Various techniques are disclosed for providing a wearable apparatus having a shield, an infrared imaging module, and a projector to present a user-viewable thermal image of an external environment on a surface of the shield. For example, a self-contained breathing apparatus (SCBA) may include a shield to protect a user from an external environment, one or more infrared imaging modules, a projector, a processor, and a communication module for projecting a user-viewable thermal image onto a surface of the shield. Such infrared imaging modules may be positioned internal to the SCBA so that they are also protected from the external environment, such as a hazardous environment. In another example, a welding mask may include one or more infrared imaging modules, a projector, a processor, and a communication module, so as to project a user-viewable thermal image onto a surface of a shield of the welding mask, while at the same time protecting these components and the welder's face from a harsh welding environment.

In one embodiment, a wearable apparatus includes a shield configured to protect at least a portion of a user's face from an external environment; an infrared imaging module comprising a focal plane array (FPA) configured to capture a thermal image of the external environment; a processor configured to convert the thermal image into a user-viewable image of the external environment; and a projector configured to project the user-viewable image onto an inner surface of the shield for viewing by the user while wearing the apparatus.

In another embodiment, a method of operating a wearable apparatus includes capturing, at a focal plane array (FPA) of an infrared imaging module of the wearable apparatus, a thermal image of an external environment; converting the thermal image into a user-viewable image of the external environment; and projecting the user-viewable image onto an inner surface of a shield of the wearable apparatus for viewing by the user, wherein the shield protects at least a portion of the user's face while the wearable apparatus is worn by the user.

In another embodiment, a method of constructing a wearable apparatus includes providing a shield for protecting at least a portion of a user's face from an external environment; positioning an infrared imaging module relative to the shield, wherein the infrared imaging module comprises a focal plane array (FPA) configured to capture a thermal image of the external environment while the apparatus is worn by the user; positioning a projector relative to the shield, wherein the projector is configured to project a user-viewable image of the external environment onto an inner surface of the shield for viewing by the user while wearing the apparatus; and communicatively coupling a processor with the infrared imaging module and the projector.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
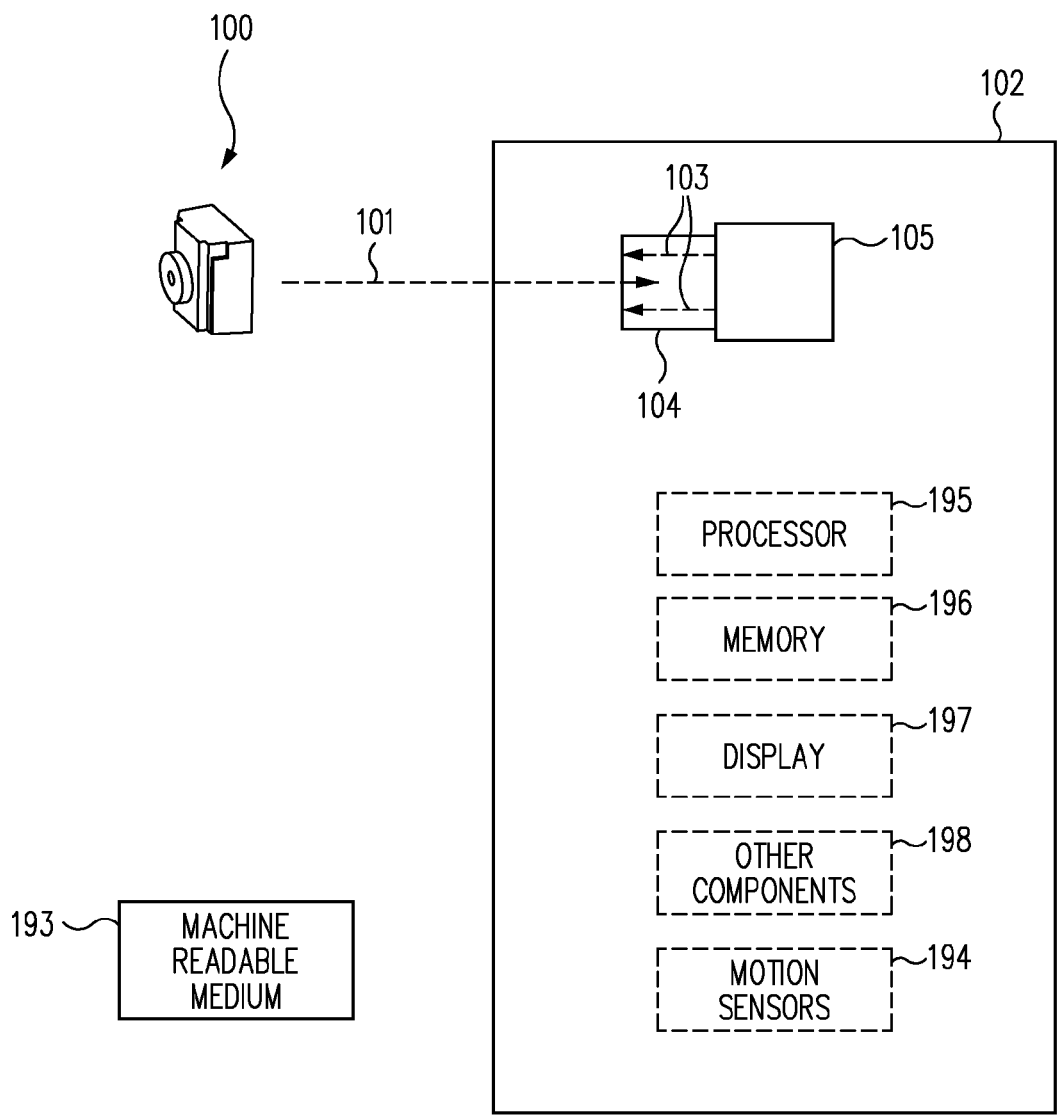
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
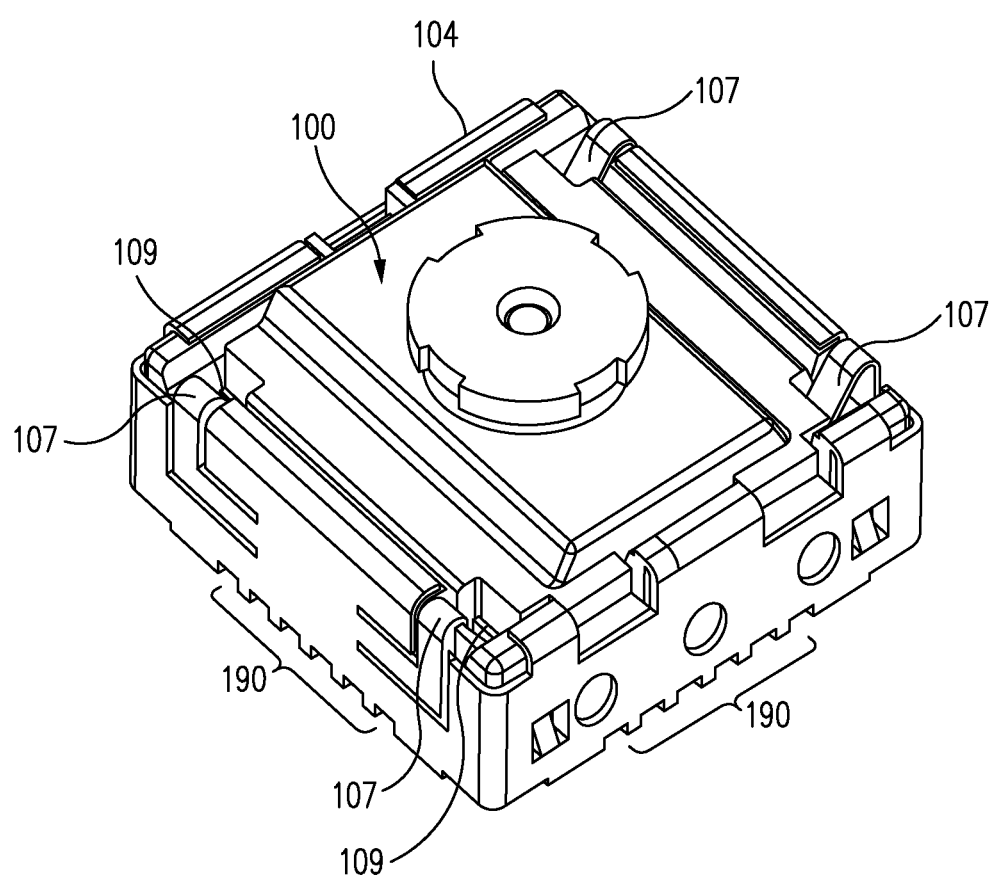
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
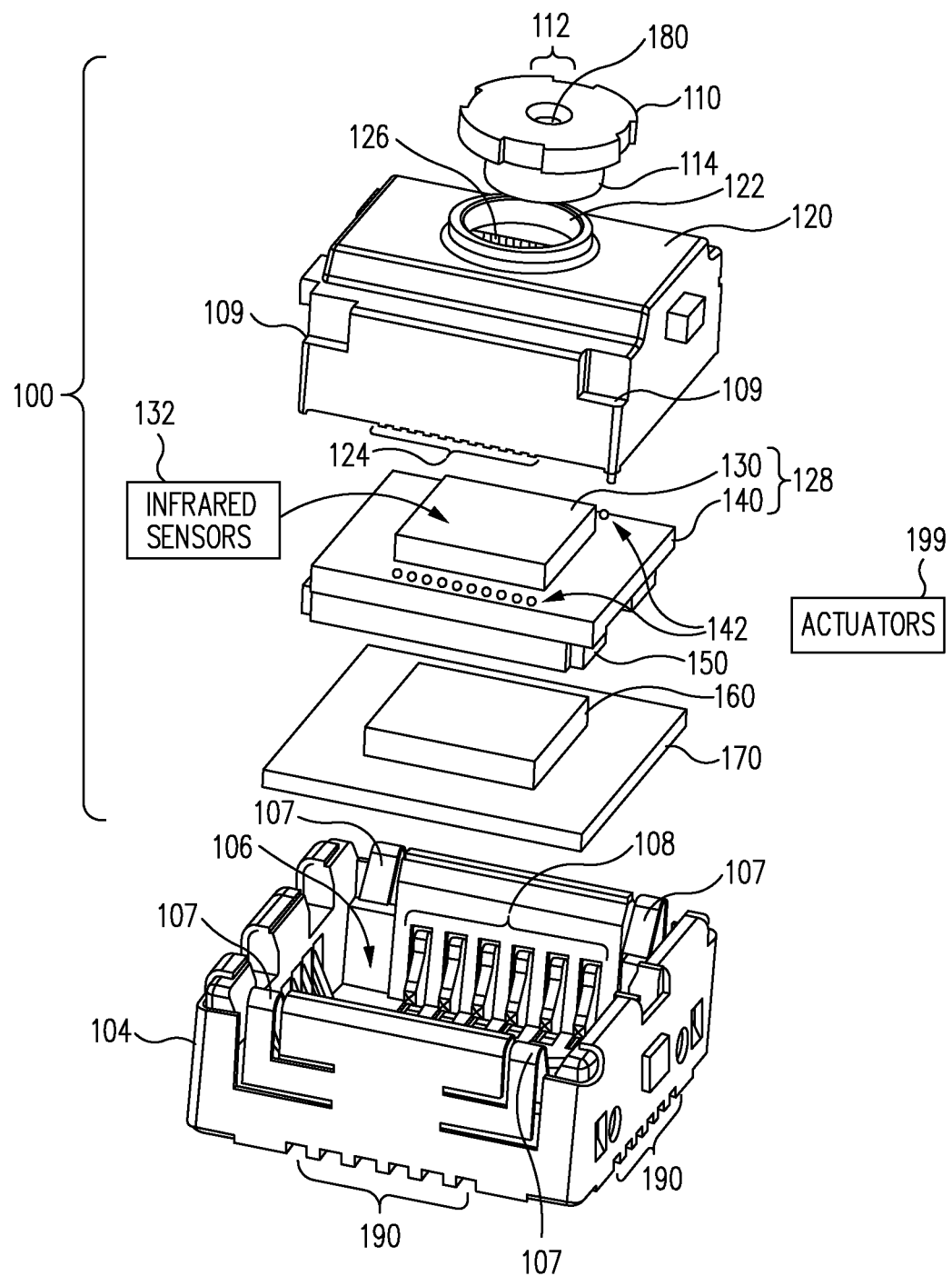
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
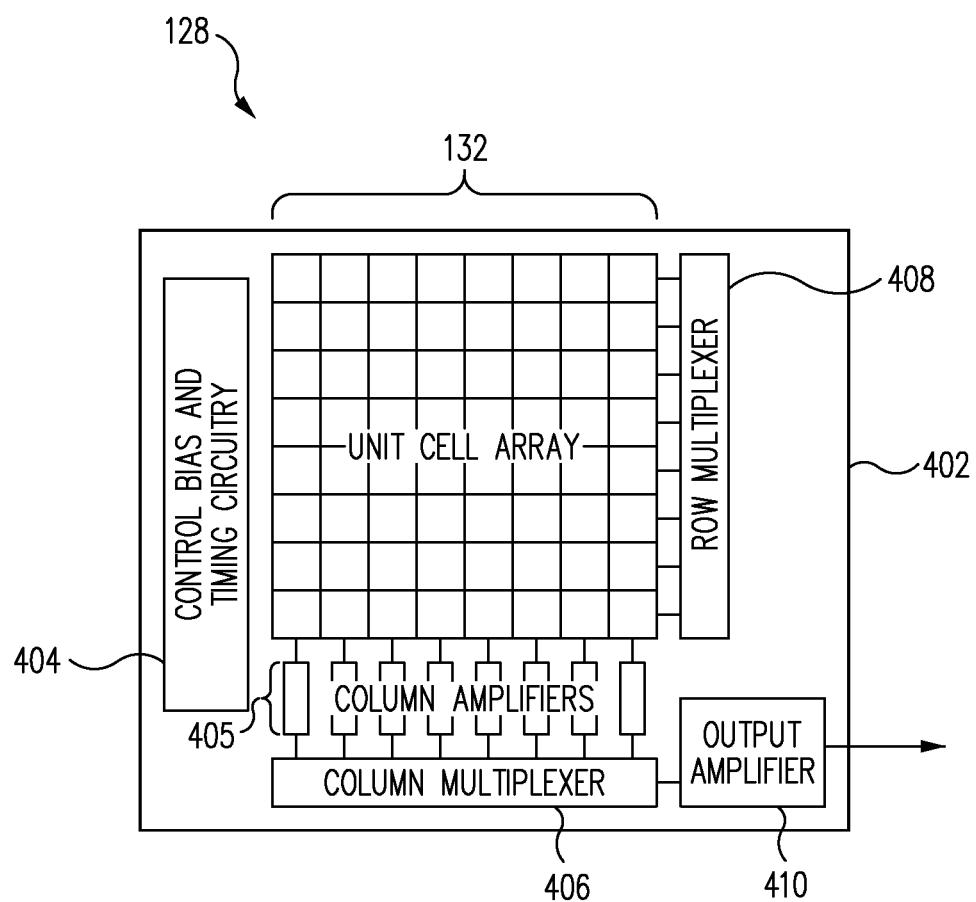
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIDI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
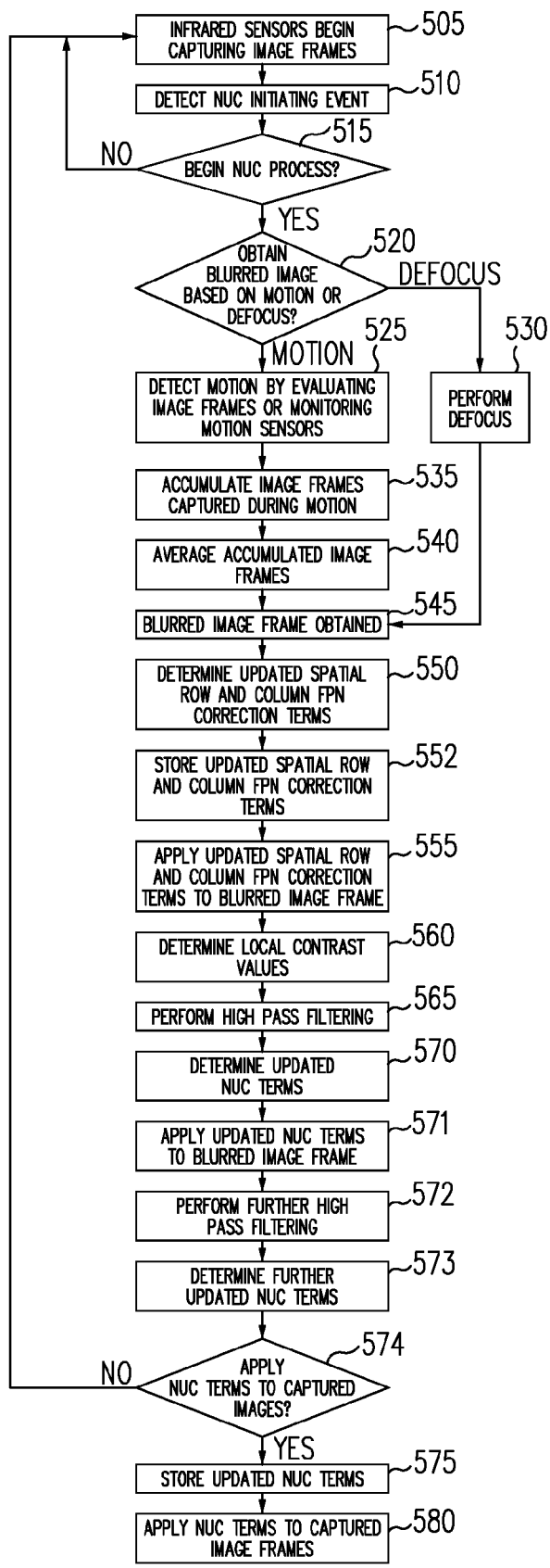
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
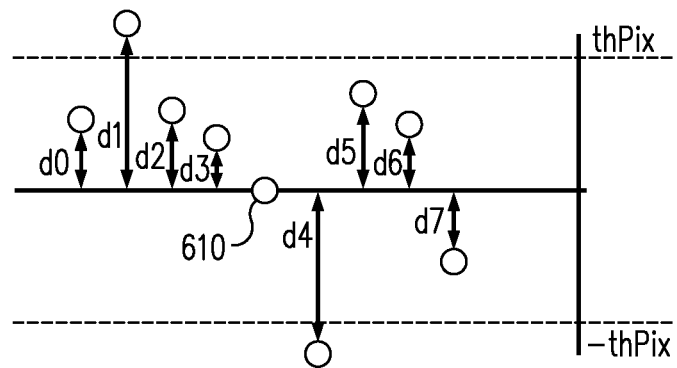
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
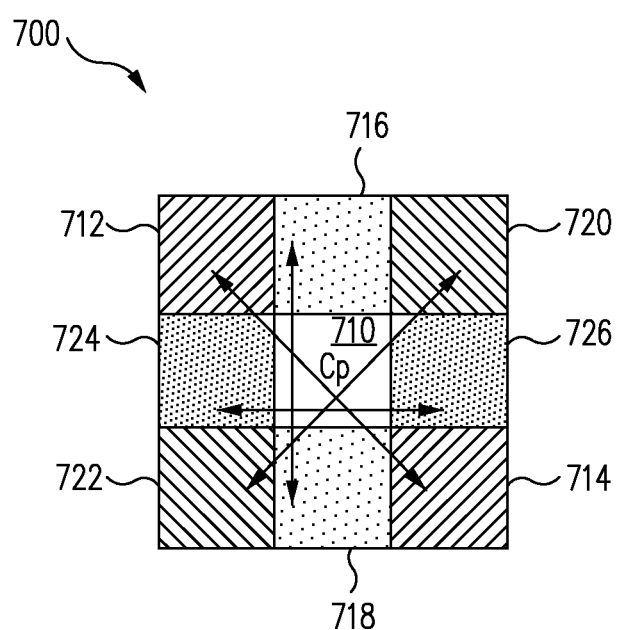
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda)\cdot(NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
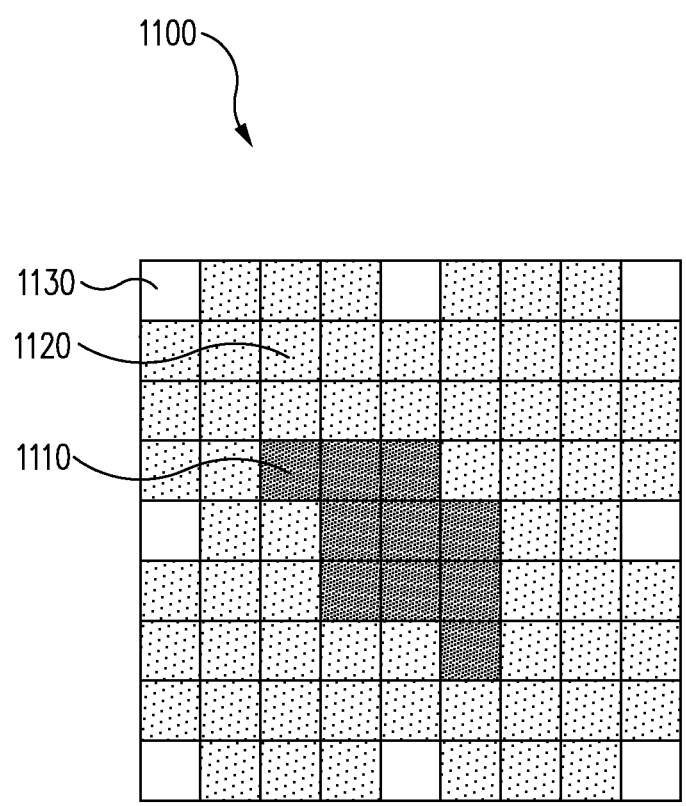
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor $\lambda$ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
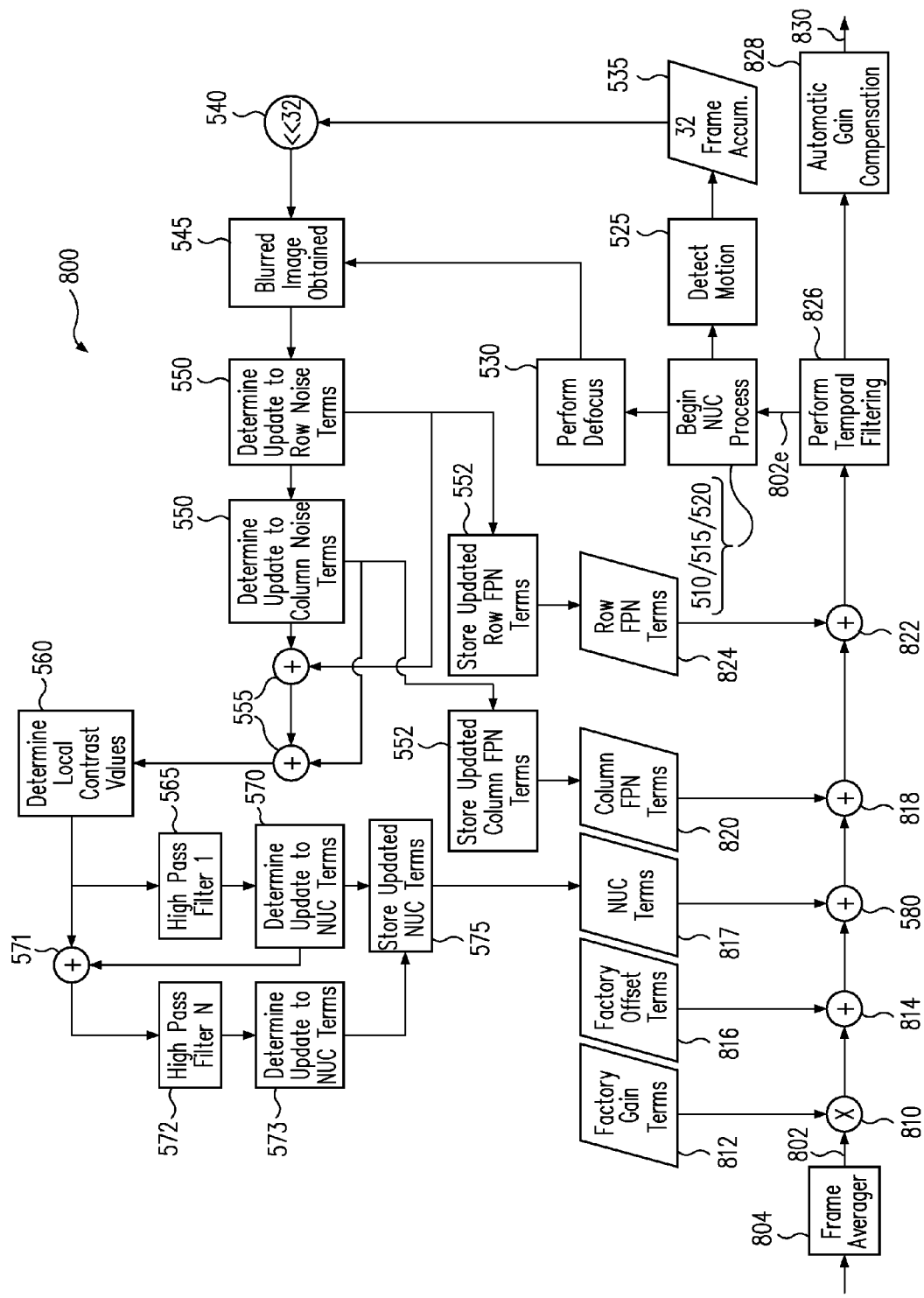
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
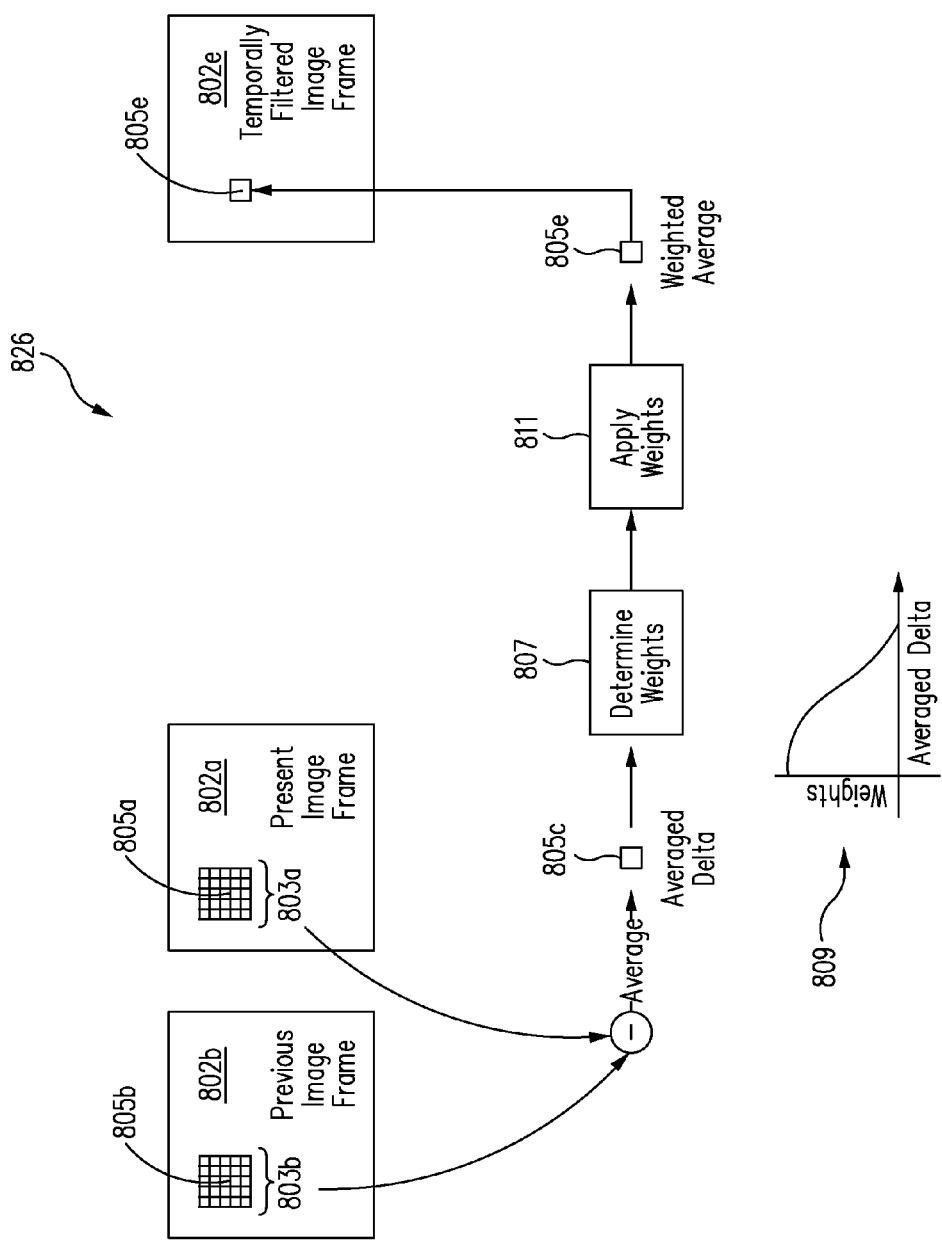
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
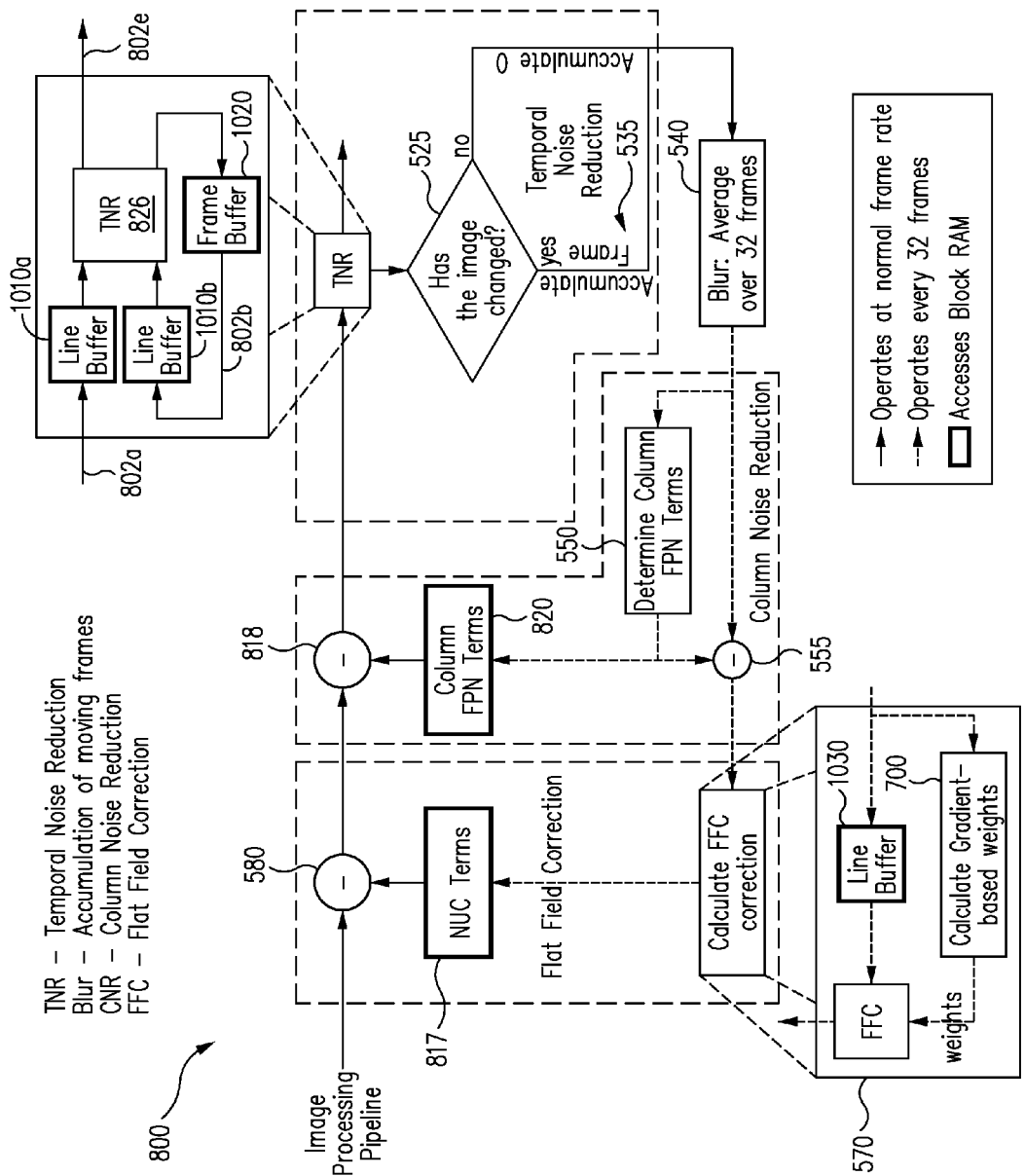
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG.

8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is $\frac{1}{32}$ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Figure 12:
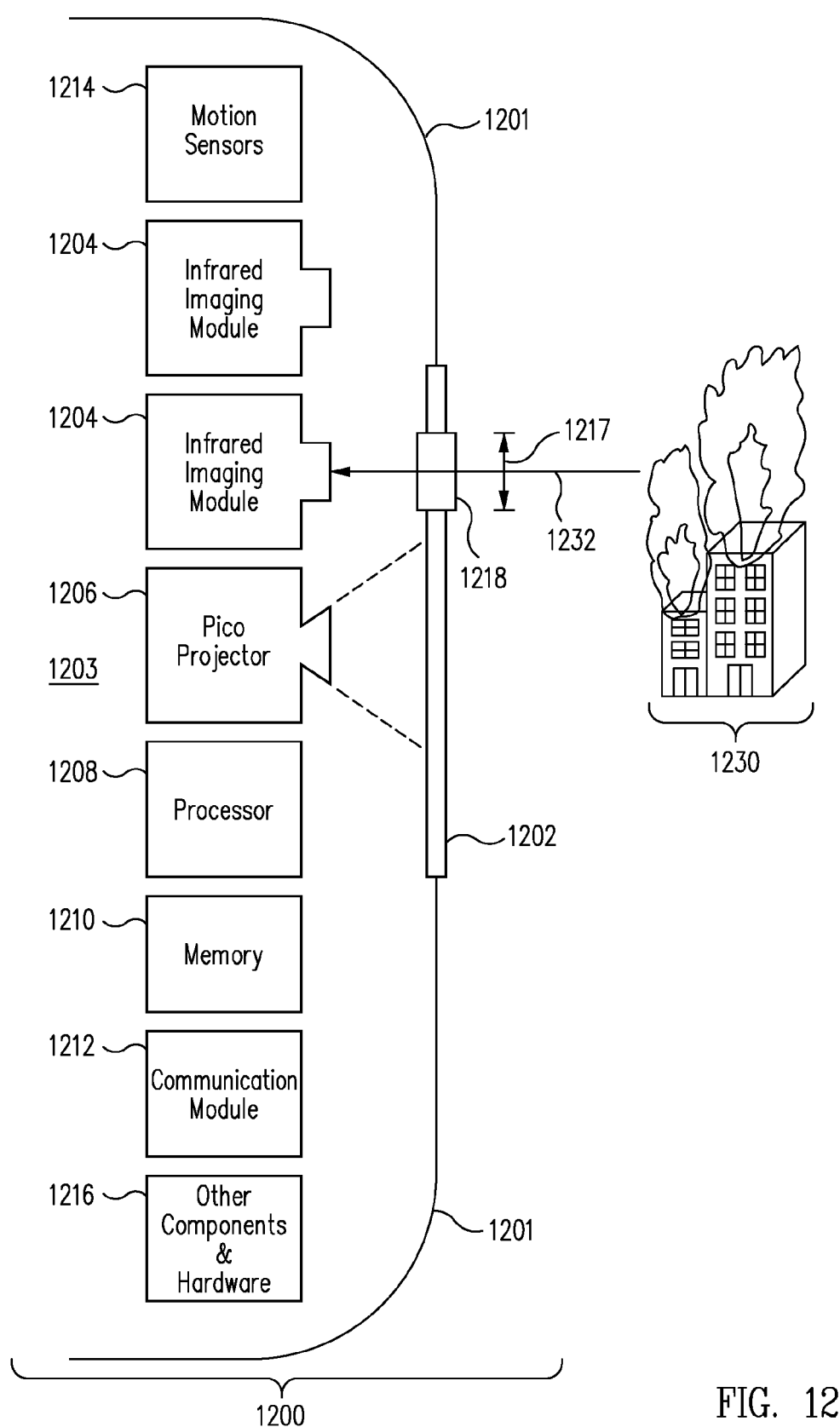
FIG. 12 illustrates a block diagram of a wearable apparatus in accordance with an embodiment of the disclosure.

Referring now to FIG. 12, a block diagram is shown of a wearable apparatus 1200 in accordance with an embodiment of the disclosure. Wearable apparatus 1200 may include a shield 1202, one or more infrared imaging modules 1204, a projector 1206, a processor 1208, a memory 1210, a communication module 1212, motion sensors 1214, and other components and hardware 1216. In various embodiments, infrared imaging modules 1204, processor 1208, memory 1210, and motion sensors 1214 may be implemented in the same of similar manner as corresponding components of host device 102 of FIG. 1. Moreover, the various components of wearable apparatus 1200 may be configured to perform various NUC processes and other processes described herein.

Shield 1202 protects at least a portion of a user's face from an external environment 1230 when wearable apparatus 1200 is worn by a user (e.g., generally identified by reference number 1203 in FIG. 12). Shield 1202 may be made of polymers (e.g., polycarbonate), metal, or any other appropriate materials durable enough to provide a protective barrier against heat, intensive light rays, debris, and/or other harmful elements from external environment 1230. Shield 1202 may comprise or may be coated with one or more appropriate protective layers to enhance or provide protection against such harmful elements.

In various embodiments, shield 1202 may provide a protective barrier against external environment 1230 for various components of wearable apparatus 1200 as well. For example, infrared imaging modules 1204, projector 1206, processor 1208, memory 1210, communication module 1212, motion sensors 1214, and/or any appropriate components of wearable apparatus 1200 may be positioned internal to wearable apparatus 1200 (e.g., behind shield 1202 and away from external environment 1230), so that shield 1202 provides protection to these components in addition to protecting at least a portion of a user's face.

Although shield 1202 is illustrated in FIG. 12 as having a limited length, shield 1202 may be implemented with any desired size. Moreover, wearable apparatus 1200 may include one or more structural members 1201 to partially or completely enclose a face, head, or any desired portion of user 1203 (e.g., including the entirety of user 1203 if desired).

In one embodiment, shield 1202 may pass at least some visible light so that user 1203 can view external environment 1230 through shield 1202, while still being protected against harmful radiation (e.g., appropriate types of infrared radiation, ultraviolet radiation, and/or others), debris, and/or other elements. In another embodiment, a portion, a majority, or an entirety of shield 1202 may be opaque or nontransparent (e.g., when shield 1202 is made of metal). In some embodiments, a surface of shield 1202 may comprise a plate onto which images may be projected from projector 1206.

Infrared imaging modules 1204 may be small form factor infrared cameras or small form factor infrared imaging devices implemented in accordance with various embodiments disclosed herein. Infrared imaging modules 1204 may include an FPA implemented, for example, in accordance with various embodiments disclosed herein or others where appropriate.

Thus, unlike certain CCD-based or CMOS-based imaging sensors which may at best detect limited reflected short wave infrared (SWIR) rays (e.g., near infrared light) from illuminated objects, infrared imaging modules 1204 may be capable of detecting and capturing long wave infrared (LWIR) radiation, mid wave infrared (MWIR) radiation, and/or other radiation in thermal bands as may be desired. As such, infrared imaging modules 1204 may be configured to capture, process, and/or otherwise manage thermal images (e.g., images including thermal radiation data) of external environment 1230 even in complete darkness, and provide such images and data to processor 1208. For example, thermal images provided by infrared imaging modules 1204 may reveal invisible hazards such as gas leaks, thermal hot spots, or others. Such thermal images may include an accurate temperature reading of each pixel in the images. In this regard, it will be appreciated that thermal images captured and provided by infrared imaging modules 1204 are significantly more useful than images of amplified visible light and SWIR radiation that may be provided by conventional light intensifiers (e.g., night vision (NV) devices).

In one embodiment, wearable apparatus 1200 may comprise a plurality of infrared imaging modules 1204 to capture stereoscopic thermal images of external environment 1230. In another embodiment, one or more of a plurality of infrared imaging modules 1204 may provide fault tolerance by serving as backups to each other.

In various embodiments, infrared imaging modules 1204 and/or processor 1208 may be configured to provide automatic exposure control (e.g., by controlling signal gain, camera aperture, and/or shutter speed) to adjust to changes in the infrared intensity and temperature level of the external environment.

In various embodiments, one or more infrared imaging modules 1204 may be positioned behind shield 1202, so as to be protected from external environment 1230 by shield 1202. In such embodiments, shield 1202 may include an aperture 1217 sealed with a window assembly 1218 capable of passing infrared rays 1232 through to infrared imaging module 1204. Window assembly 1218 may be made of a material (e.g., silicon or other material) having a high transmittance for infrared light, so that infrared light emitted from external environment 1230 reaches infrared imaging module 1204 while shield 1202 blocks infrared light from user 1203 and/or various components of wearable apparatus 1200. In some embodiments, window assembly 1218 may be doped with appropriate material so that only infrared light in a desired wavelength range may pass through. Window assembly 1218 may be implemented in accordance with various types of structures as further described herein with regard to FIG. 13C.

Processor 1208 may be implemented as any appropriate processing device as described with regard to processor 195 in FIG. 1. In some embodiments, at least some part of processor 1208 may be implemented as part of infrared imaging modules 1204 and/or projector 1206.

Processor 1208 may be configured to receive one or more thermal images captured by infrared imaging module 1204, and to process the thermal images to generate user-viewable thermal images (e.g., thermograms) of external environment 1230. In one embodiment, processor 1208 may generate and overlay information and/or alarms (e.g., a temperature reading, a gas detection alarm, mask pressure reading and alarm, oxygen tank reading and alarm, and/or others) onto user-viewable images. In some embodiments, processor 1208 may be configured to receive one or more thermal images from two or more infrared imaging modules 1204, and to appropriately combine the thermal images to generate stereoscopic user-viewable images (e.g., three dimensional thermograms) of external environment 1230 therefrom.

Projector 1206 may be implemented with any appropriate small form factor projector, including those known as "pico" or "micro" projectors. For example, in one embodiment, projector 1206 may be sized small enough to be embedded inside personal electronic devices such as mobile phones or digital cameras. In various embodiments, projector 1206 may be implemented in accordance with various technologies such as digital light processing (DLP), liquid crystal on silicon (LCoS), laser beam steering (LBS), holographic laser projection (HLP), and/or others as appropriate.

Projector 1206 may be positioned so as to selectively project user-viewable thermal images onto an inner surface of shield 1202. For example, projector 1206 can be turned on to project user-viewable thermal images onto a portion of an inner surface of shield 1202 that is comfortably within a line of sight of user 1203 while wearable apparatus 1200 is worn, and can be turned off when user 1203 desires a clear view through shield 1202. Moreover, the direction of a beam from projector 1206 may be adjustable to project user-viewable thermal images onto an area of shield 1202 that is comfortable for viewing by a user, for example, for viewing images projected on shield 1202, and simultaneously viewing external environment 1230 through shield 1202. In contrast, conventional fixed-type displays, such as fixed LCD screens (e.g., viewed directly, through a scope or an objective lens), may obstruct a user's view even when not used, and may make it difficult for a user to adjust the screen's position or to simultaneously view visible light from external environment 1230 in realtime.

In various embodiments, projector 1206 may be configured to perform a distortion correction of user-viewable images projected on a surface of shield 1202, so that the user-viewable images appear flat and geometrically correct even when projected at an oblique angle and/or onto a curved surface of shield 1202. In some embodiments, projector 1206 may optically correct distortion using optical elements such as lenses, prisms, and mirrors.

In embodiments in which projector 1206 is implemented with HLP technology, distortion may be corrected through appropriate operations performed by projector 1206 and/or processor 1208. In this regard, such HLP technology may implement holographic processes to generate interference or diffraction patterns of an image instead of the image itself, and focused laser beams may be projected through such interference patterns to direct light as desired without relying on optical elements.

In some embodiments, projector 1206 may be configured to project two or more beams of light to present stereoscopic user-viewable images of external environment 1230 as described above. It is also contemplated that projector 1206 may be configured to project three dimensional user-viewable images using HLP technology.

Communication module 1212 may be configured to handle internal communication between various components of wearable apparatus 1200. For example, components such as infrared imaging modules 1204, projector 1206, and other sensors may transmit and receive data to and from processor 1208 through communication module 1212, which may manage wired and/or wireless connections (e.g., through proprietary RF links and/or through standard wireless communication protocols such as IEEE 802.11 WiFi standards and Bluetooth™) between the various components.

In some embodiments, communication module 1212 may be further configured to handle communication with devices external to wearable apparatus 1200. For example, communication module 1212 may transmit and receive user-viewable images generated by processor 1208 to and from other wearable apparatuses or a monitoring station so that user-viewable images can be shared with other users. In another example, communication module 1212 may handle a more conventional communication such as radio communication between users of wearable apparatus 1200.

Other components and hardware 1216 may be used to implement any features of wearable apparatus 1200 as may be desired for various applications. For example, other components may include various sensors, a microphone and speaker for voice communication, timers, a flashlight, and a visible light camera. Other hardware may include a mask frame, a hood, straps, fasteners, harnesses, connectors, hoses, and other various hardware and protective equipment and clothing as may be desired for certain applications of wearable apparatus 1200.

Thus, it will be appreciated that wearable apparatus 1200 may be implemented as any type of wearable device, equipment, gear, mask, helmet, garment, and/or clothing that includes shield 1202 to protect at least a portion of a user's face from external environment 1230.

Figure 13A:
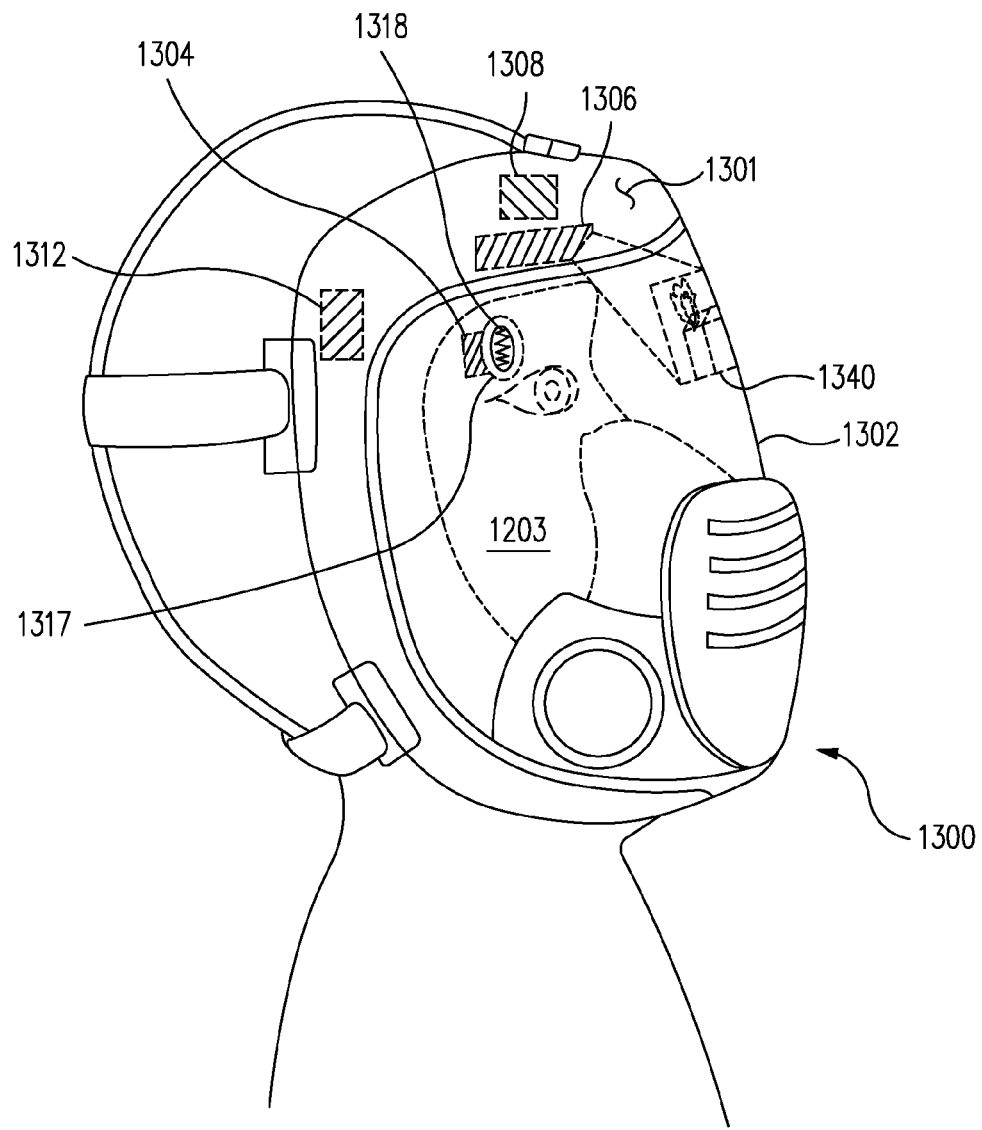
FIGS. 13A-C illustrate various views of a wearable apparatus implemented as a self-contained breathing apparatus (SCBA) in accordance with embodiments of the disclosure.
Figure 13B:
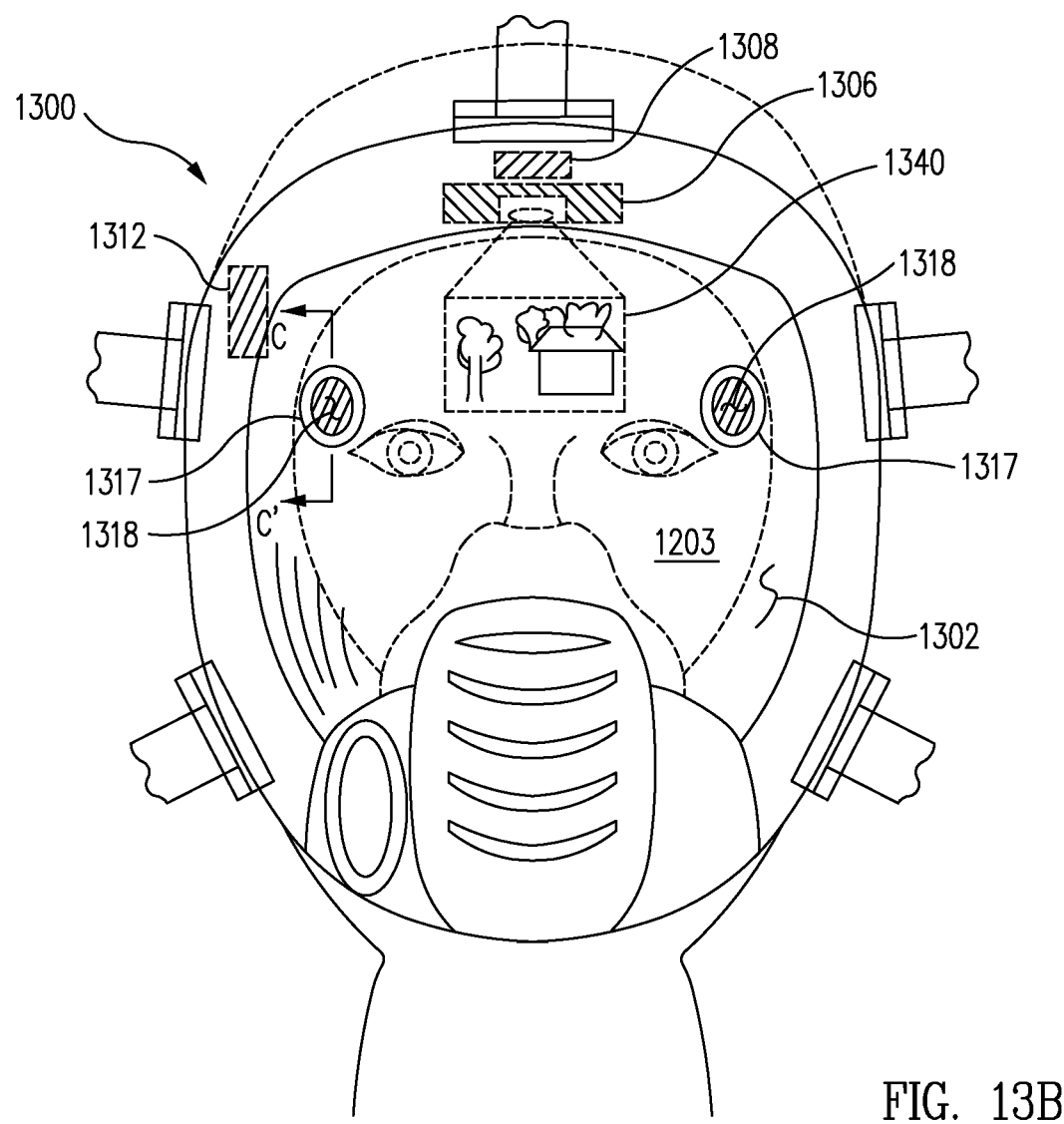
Figure 13C:
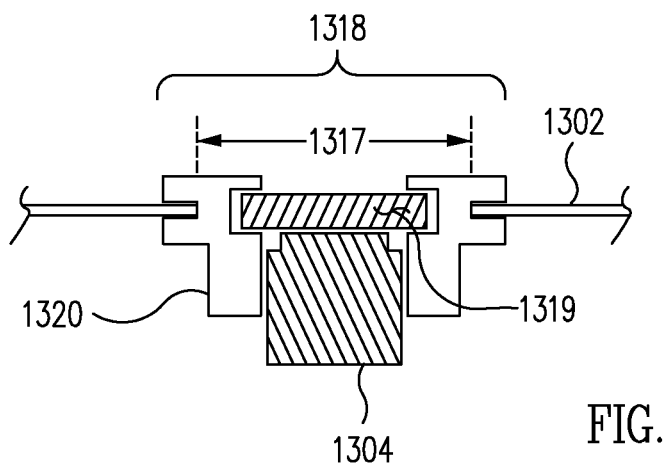

FIGS. 13A-C illustrate various views of wearable apparatus 1200 implemented as a self-contained breathing apparatus (SCBA) 1300, in accordance with embodiments of the disclosure. In particular, FIGS. 13A and 13B illustrate side and front views, respectively, of SCBA 1300 worn by user 1203 and having infrared imaging modules 1304 and a projector 1306 in accordance with embodiments of the disclosure. FIG. 13C illustrates a cross-sectional view of a window assembly 1318 of SCBA 1300, taken along line C-C' of FIG. 13B in accordance with an embodiment of the disclosure.

In one embodiment, SCBA 1300 may be implemented as a face mask for use by firefighters and/or other emergency personnel working in hazardous environments. In this regard, SCBA 1300 may be implemented to attach to a portable air supply (e.g., one or more high-pressure air tanks) and may further include an inhalation connection (e.g., a mouthpiece or orinasal cover and a hose connector) to the air supply while protecting a wearer's face from hazardous environments. In another embodiment, SCBA 1300 may be configured for underwater use as a self-contained underwater breathing apparatus (SCUBA).

SCBA 1300 may include a shield 1302, one or more infrared imaging modules 1304, projector 1306, a processor 1308, and a communication module 1312, all of which may be implemented in the same or similar manner as various corresponding components of wearable apparatus 1200 described above with regard to FIG. 12.

SCBA 1300 may further include a mask frame 1301 (e.g., corresponding to structural members 1201 of FIG. 12) onto which shield 1302 is sealingly fit. Mask frame 1301 may include an edge that compliantly engages the contours of the user's face, so that the user's face and SCBA 1300 form an interior space that is substantially sealed from an external environment. In some embodiments, the interior space of SCBA 1300 may maintain a positive pressure (i.e., higher pressure inside SCBA 1300 than outside) so as to prevent inward leaking.

Shield 1302 may be made of a clear polymer (e.g., polycarbonate) or other similar suitable materials that allow user 1203 to see through while providing a protective barrier against heat, flames, intense infrared and ultraviolet rays, debris, and/or other harmful elements from an external environment. Shield 1302 may comprise multiple layers of protective shields and/or surface coatings to enhance protection.

One or more infrared imaging modules 1304 may be positioned behind shield 1302 or mask frame 1301, and internal to SCBA 1300. Similarly, projector 1306, processor 1308, communication module 1312, and other components may be placed internal to SCBA 1300 (e.g., behind shield 1302 and behind or within mask frame 1301). It will be appreciated that these various components are thus advantageously protected by shield 1302 and mask frame 1301 of SCBA 1300 itself, without the need for separate protective external housings. It will also be appreciated that the small size and weight of infrared imaging modules 1304 advantageously permit these components to be positioned internal to SCBA 1300. In contrast, conventional infrared cameras are typically too bulky and heavy for such placement and thus must be implemented with separate protective housings that add even further weight and bulk, making them unsuitable for an apparatus worn on the head or face of a user. In another embodiment, one or more infrared imaging modules 1304 may be positioned on or attached to SCBA 1300 externally.

Shield 1302 may include one or more apertures 1317 sealed by corresponding window assemblies 1318 capable of passing infrared radiation through to corresponding infrared imaging modules 1304 situated behind shield 1302, behind mask frame 1301, and/or within mask frame 1301.

In one embodiment, such a window assembly 1318 may include a window 1319 and a frame 1320. Window 1319 may be configured to pass infrared radiation. For example, window 1319 may include silicon and/or other materials where appropriate to pass infrared radiation. Frame 1320 may be configured to hold window 1319 and seal aperture 1317 with window 1319. In another embodiment, window assembly 1318 may be implemented by window 1319 alone without frame 1320. In another embodiment, infrared imaging module 1304 may be configured to seal aperture 1317 to prevent user 1203 from being exposed to the external environment if the seal provided by the window assembly 1318 fails (e.g., to prevent inward leaking of gas, liquid, radiation, and/or other elements into the interior of SCBA 1300).

As discussed above in connection with projector 1206 of FIG. 12, projector 1306 may allow user 1203 to selectively turn on/off and adjust the position of a projected user-viewable thermal image 1340, for example, for simultaneously viewing projected user-viewable thermal image 1340 and an external environment through shield 1302. Distortion correction may be performed by projector 1306 and/or processor 1308 for user-viewable thermal image 1340 to be projected on a curved surface of shield 1302 and/or projected at an oblique angle, as described above. In other embodiments, projector 1306 may project user-viewable thermal image 1340 on an outer surface of shield 1302 and/or a plated portion of a surface of shield 1302.

Thus, it will be appreciated that SCBA 1300 advantageously allows user 1203 (e.g., firefighters, emergency personnel, divers, or anyone wearing SCBA 1300 for protection from an external environment) to comfortably view a user-viewable thermal image 1340 that helps user 1203 to recognize much more about an external environment (e.g., see through smoke, water or in darkness, discern victims or other objects, detect the base of fire, detect the temperature of objects, detect invisible gas leaks, or other phenomena) than what can be seen through the naked eye or through CCD-based or CMOS-based sensors, while also protecting the user's face and various components (e.g., protecting infrared imaging modules 1304, projector 1306, processor 1308 without a need for bulky and heavy external protective housings).

Figure 14B:
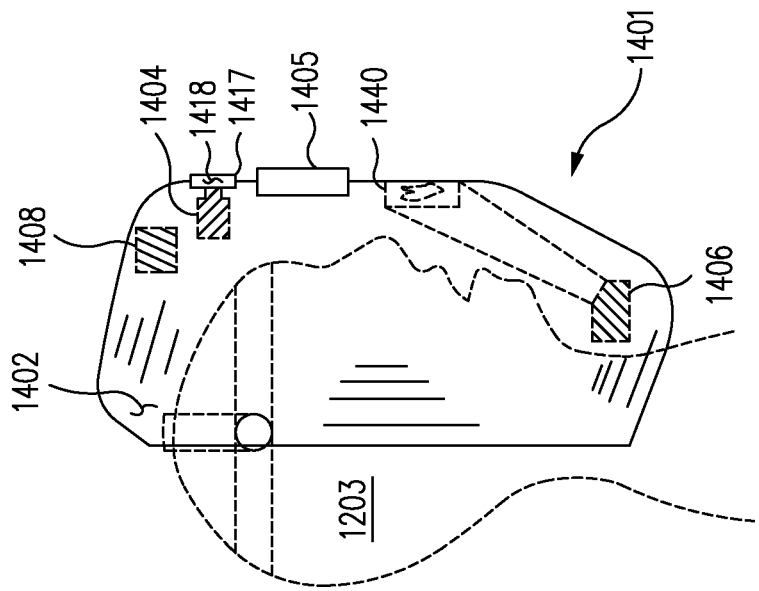
FIGS. 14A-B illustrate side views of several wearable apparatuses implemented as welding masks in accordance with various embodiments of the disclosure.
Figure 14A:
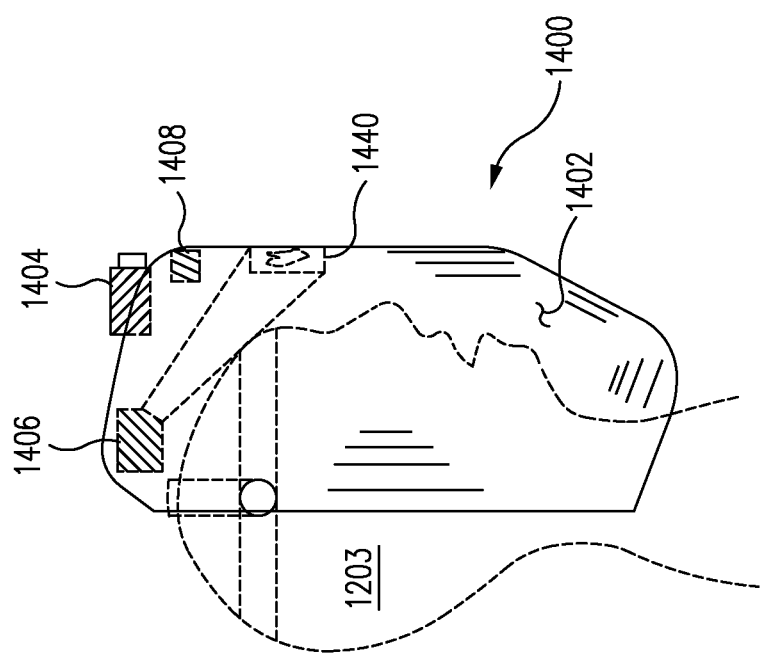

FIGS. 14A-B illustrate side views of wearable apparatus 1200 implemented as welding masks 1400 and 1401 in accordance with various embodiments of the disclosure. Welding masks 1400/1401 may be worn by user 1203 and may include a shield 1402, one or more infrared imaging modules 1404, a projector 1406, and a processor 1408, all of which may be implemented in the same or similar manner as various corresponding components of wearable apparatus 1200 and SCBA 1300 described above. In welding mask 1400 of FIG. 14A, projector 1406 is top mounted and shield 1402 has no user viewable opening. In welding mask 1401 of FIG. 14B, projector 1406 is bottom mounted and shield 1402 has a user viewable opening 1405.

Shield 1402 may be made of one or more layers of durable material that is opaque or substantially nontransparent, so as to protect a user's face from intense light (e.g., including infrared and ultraviolet light) as well as from heat, sparks, and other debris that may be generated during welding. In the embodiment of FIG. 14B, viewing window 1405 may be tinted (e.g., using tinted sheets of glass, polarized lenses, automatic LCD shutter, or other appropriately tinted materials) to attenuate the intensity of light that may reach user's eyes while still allowing user 1203 to see through.

As described above in connection with FIGS. 12 and 13A-C, various components may be protected by shield 1402 of welding masks 1400/1401. As shown in FIG. 14B, shield 1402 may include one or more apertures 1417 sealed with corresponding window assemblies 1418 implemented in the same or similar manner as window assemblies 1218/1318 described above, so as to pass infrared light through to corresponding infrared imaging modules 1404 that may be positioned internal to shield 1402. In one embodiment, one or more infrared imaging modules 1404 may be mounted externally, for example on a top outside surface of shield 1402, as shown in FIG. 14A.

Projector 1406 may be configured to project a user-viewable thermal image 1440 of a welding environment on a portion of a surface of shield 1402 that is comfortable for a user to view, as shown in FIGS. 14A-B. It is to be understood that a surface of shield 1402 may also include a surface of viewing window 1405, if desired.

User-viewable thermal image 1440 may help user 1203 better discern a welding scene, since user-viewable thermal images 1440 may be substantially clear of blindingly intense visible light radiation that are generated when welding. As described above with respect to FIG. 12, infrared imaging modules 1404 and/or processor 1408 may be configured to provide automatic exposure control, so as to generate user-viewable thermal images 1440 that are desirably adjusted to the infrared intensity and temperature level in the welding scene. Exposure-adjusted user-viewable thermal images 1440 may provide a clear view of the welding scene even when the infrared intensity and temperature level change (e.g., when user 1203 turns off a welding arc to adjust a welding tip of appropriate welding equipment), so that user 1203 can view the welding scene without having to lift, remove, and/or otherwise adjust welding mask 1400/1401 for a better view.

In addition, processor 1408 may be configured to overlay temperature readings and/or temperature scales onto a user-viewable thermal image 1440 to be projected onto a surface of shield 1402. Such temperature readings and/or temperature scales may help a user to determine whether the temperature of a welding arc and/or welding pool is proper for a welding task.

Thus, it will be appreciated that welding masks 1400/1401 advantageously protect a welder's face as well as various components of welding masks 1400/1401 from harsh elements of a welding environment, while also presenting to a welder a user-viewable thermal image 1440 that provides a clearer view of a welding environment along with useful information such as temperature readings of weld materials and a view of otherwise invisible objects (e.g., gas leaks).

Figure 15:
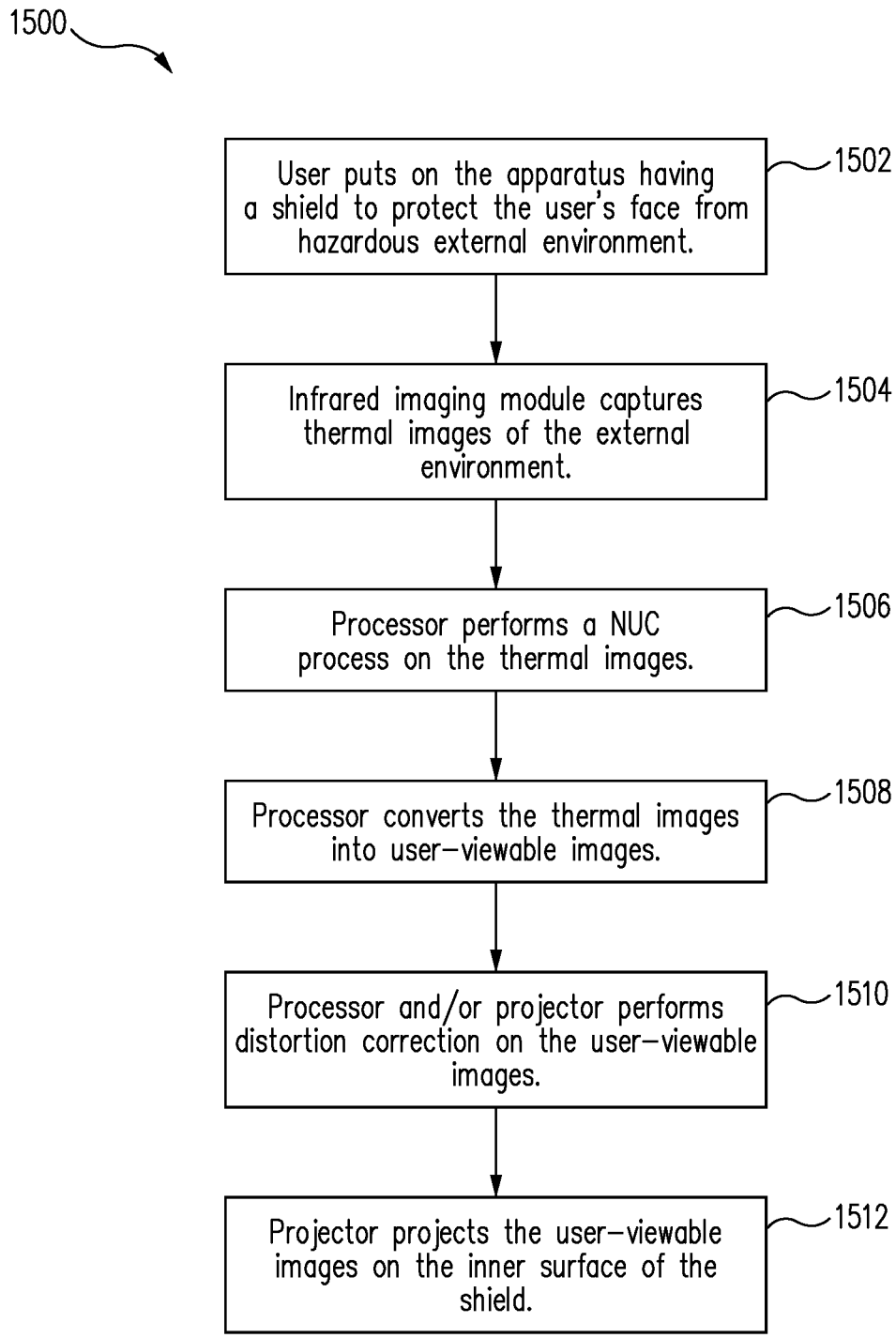
FIG. 15 illustrates a process to present a user-viewable thermal image on a wearable apparatus in accordance with an embodiment of the disclosure.

FIG. 15 illustrates a process to present a user-viewable thermal image on wearable apparatus 1200, in accordance with an embodiment of the disclosure. In this regard, the process of FIG. 15 may be applied generally to wearable apparatus 1200 and also to particular examples of wearable apparatus 1200 such as SCBA 1300, welding masks 1400/1401, and other applications where appropriate.

At block 1502, user 1203 may put on wearable apparatus 1200 having shield 1202/1302/1402 that is configured to protect at least a portion of the user's face from external environment 1230. For example, a firefighter may put on SCBA 1300 to protect the firefighter's face from a scene of fire, a diver may put on SCBA 1300 when diving underwater, or a welder may put on welding mask 1400/1401 to protect the welder's face from a hazardous welding environment.

At block 1504, one or more thermal images of external environment 1230 may be captured by one or more infrared imaging modules 1204/1304/1404. The one or more thermal images may be received, for example, at processor 1208/1308/1408 that is communicatively coupled via wired or wireless link to one or more infrared imaging modules 1204/1304/1404. At block 1506, a NUC process may be performed to remove noise from the thermal images, for example, by using various NUC techniques disclosed herein.

From the thermal images, user-viewable images (e.g., thermograms) may be generated by processor 1208/1308/1408 at block 1508. Also at block 1508, in various embodiments, additional information and/or alarms may be overlaid onto the user-viewable images by processor 1208/1308/1408. Also at block 1508, if processor 1208/1308/1408 is configured to receive one or more thermal images from two or more infrared imaging modules 1204/1304/1404, stereoscopic user-viewable images of external environment 1230 may be generated by processor 1208/1308/1408.

At block 1510, a distortion correction may be performed on the user-viewable images by projector 1206/1306/1406 and/or processor 1208/1308/1408. For example, projector 1206/1306/1406 may optically correct distortion of the user-viewable images to be projected onto a curved surface and/or projected at an oblique angle. In another example, projector 1206/1306/1406 and/or processor 1208/1308/1408 may correct such distortion computationally using appropriate holographic processes for projector 1206/1306/1406 based on interference/diffraction patterns.

At block 1512, the corrected user-viewable images may be projected onto a surface of shield 1202/1302/1402 by projector 1206/1306/1406 for viewing by a user while wearing wearable apparatus 1200/SCBA 1300/welding mask 1400. The user-viewable images may be projected onto an area of shield 1202/1302/1402 that is comfortable for viewing by a user, for example, for simultaneously viewing projected images and an external environment through shield 1202/1302/1402.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A wearable apparatus comprising:
a shield configured to protect at least a portion of a user's face from an external environment and pass at least some visible light from the external environment to the user for viewing the external environment through the shield;
an infrared imaging module comprising a lens and a focal plane array (FPA) configured to capture a thermal image of the external environment;
a processor configured to convert the thermal image into a user-viewable image of the external environment; and
a projector configured to project the user-viewable image onto an inner surface of the shield for viewing by the user while wearing the apparatus,
wherein the infrared imaging module is positioned interior to and behind the shield to be protected from the external environment by the shield.

2. The apparatus of claim 1, wherein:
the shield comprises a window configured to pass infrared radiation from the external environment;
the infrared imaging module is positioned behind the window of the shield to receive the infrared radiation passed through the window.

3. The apparatus of claim 2, wherein:
the shield comprises an aperture; and
the window is part of a window assembly that seals the aperture.

4. The apparatus of claim 3, wherein:
the window is made of a material comprising silicon; and
the window assembly comprises a frame configured to hold the window and seal the aperture with the window.

5. The apparatus of claim 3, wherein the infrared imaging module is configured to seal the aperture to prevent the user from being exposed to the external environment if the seal provided by the window assembly fails.

6. The apparatus of claim 1, wherein:
the apparatus is a self-contained breathing apparatus (SCBA) further comprising a mask frame sealingly coupled to the shield and configured to sealingly engage the user.

7. A wearable apparatus comprising:
a shield configured to protect at least a portion of a user's face from an external environment;
an infrared imaging module comprising a focal plane array (FPA) configured to capture a thermal image of the external environment;
a processor configured to convert the thermal image into a user-viewable image of the external environment; and
a projector configured to project the user-viewable image onto an inner surface of the shield for viewing by the user while wearing the apparatus,
wherein the apparatus is a welding mask and at least a majority of the shield is substantially opaque and configured to substantially block visible light from the external environment.

8. The apparatus of claim 1, wherein:
the infrared imaging module is a first infrared imaging module;
the thermal image is a first thermal image;
the apparatus further comprises a second infrared imaging module configured to capture a second thermal image of the external environment; and
the user-viewable image is a stereoscopic image of the external environment based on the first and second thermal images.

9. The apparatus of claim 1, wherein the projector is further configured to perform a distortion correction of the user-viewable image to compensate for at least one of an angle of projection or a shape of the inner surface of the shield.

10. The apparatus of claim 1, wherein the projector is a holographic projector.

11. The apparatus of claim 1, wherein:
the thermal image is an unblurred thermal image of the external environment;
the infrared imaging module is further configured to capture an intentionally blurred thermal image of the external environment; and
the processor is further configured to determine a plurality of non-uniform correction (NUC) terms based on the intentionally blurred thermal image, apply the NUC terms to the unblurred thermal image to remove noise form the unblurred thermal image, and convert the unblurred thermal image into the user-viewable image.

12. A method of presenting a user-viewable image on a wearable apparatus, the method comprising:
capturing, using a lens and a focal plane array (FPA) of an infrared imaging module of the wearable apparatus, a thermal image of an external environment;
converting the thermal image into a user-viewable image of the external environment;
projecting the user-viewable image onto an inner surface of a shield of the wearable apparatus for viewing by a user;
passing, by the shield, at least some visible light from the external environment to the user for viewing the external environment through the shield; and
protecting at least a portion of the user's face and the infrared imaging module from the external environment by the shield while the wearable apparatus is worn by the user, wherein the infrared imaging module is positioned interior to and behind the shield to be protected from the external environment.

13. The method of claim 12, further comprising passing, by a window provided in the shield, infrared radiation from the external environment to the infrared imaging module, wherein the infrared imaging module is positioned behind the window of the shield to receive the infrared radiation passed through the window.

14. The method of claim 13, further comprising sealing, by a window assembly that comprises the window, an aperture in the shield.

15. The method of claim 14, wherein:
the passing of the infrared radiation is by a material of the window comprising silicon; and
the sealing of the aperture in the shield comprises holding the window by a frame of the window assembly to seal the aperture with the window.

16. The method of claim 14, further comprising sealing the aperture by the infrared imaging module to prevent the user from being exposed to the external environment if the sealing by the window assembly fails.

17. The method of claim 12, wherein the apparatus is a self-contained breathing apparatus (SCBA), the method further comprising sealingly engaging a mask frame of the apparatus with the user, wherein the mask frame is sealingly coupled to the shield.

18. The method of claim 12, wherein the apparatus is a welding mask and at least a majority of the shield is substantially opaque, the method further comprising substantially blocking visible light from the external environment by the majority of the shield that is substantially opaque.

19. The method of claim 12, wherein:
the infrared imaging module is a first infrared imaging module;
the thermal image is a first thermal image;
the method further comprises capturing, at a second infrared imaging module of the wearable apparatus, a second thermal image of the external environment; and
the user-viewable image is a stereoscopic image of the external environment based on the first and second thermal images.

20. The method of claim 12, further comprising:
performing a distortion correction of the user-viewable image to compensate for at least one of an angle of projection or a shape of the inner surface of the shield.

21. The method of claim 12, wherein the projecting is performed by a holographic projector.

22. The method of claim 12, wherein the thermal image is an unblurred thermal image, the method further comprising:
capturing an intentionally blurred thermal image of the external environment;
determining a plurality of non-uniform correction (NUC) terms based on the intentionally blurred thermal image;
applying the NUC terms to the unblurred thermal image to remove noise from the unblurred theiinal image; and
converting the unblurred thenaal image into the user-viewable image.

23. A method of constructing a wearable apparatus, the method comprising:
providing a shield for protecting at least a portion of a user's face from an external environment, wherein the shield is configured to pass at least some visible light for the user to view the external environment through the shield;
positioning an infrared imaging module interior to and behind the shield to protect the infrared imaging module from the external environment by the shield, wherein the infrared imaging module comprises a lens and a focal plane array (FPA) configured to capture a thermal image of the external environment while the apparatus is worn by the user;
positioning a projector relative to the shield, wherein the projector is configured to project a user-viewable image of the external environment onto an inner surface of the shield for viewing by the user while wearing the apparatus; and
communicatively coupling a processor with the infrared imaging module and the projector.

24. The method of claim 23, further comprising:
providing an aperture in the shield;
sealing the aperture with a window that is configured to pass infrared radiation from the external environment; and
positioning the infrared image module behind the window of the shield to receive the infrared radiation passed through the window.

* * * * *